(12) United States Patent
Jordan et al.

(10) Patent No.: US 7,525,000 B2
(45) Date of Patent: Apr. 28, 2009

(54) ACETYLENE REMOVAL METHODS AND APPARATUS

(75) Inventors: James M. Jordan, Longview, TX (US); Kevin H. McGuire, White Oak, TX (US); Daryl Bitting, Longview, TX (US); George M. McLeod, Hallsville, TX (US); Randall L. Lamirand, Longview, TX (US); James J. Cerrato, Longview, TX (US); Ronnie P. Pertuit, Longview, TX (US)

(73) Assignee: Eastman Chemical Company, Kingsport, TN (US)

(*) Notice: Subject to any disclaimer, the term of this patent is extended or adjusted under 35 U.S.C. 154(b) by 613 days.

(21) Appl. No.: 11/087,448

(22) Filed: Mar. 23, 2005

(65) Prior Publication Data

US 2005/0222476 A1     Oct. 6, 2005

Related U.S. Application Data

(60) Provisional application No. 60/558,027, filed on Mar. 31, 2004.

(51) Int. Cl.
*C07C 5/03* (2006.01)
*C07C 5/08* (2006.01)
*C07C 7/167* (2006.01)

(52) U.S. Cl. .................. 585/259; 585/258; 585/260; 585/330

(58) Field of Classification Search .............. 585/258, 585/259, 260, 330
See application file for complete search history.

(56) References Cited

U.S. PATENT DOCUMENTS

| 3,775,506 | A | | 11/1973 | Houston, Jr. et al. |
| 6,037,515 | A | | 3/2000 | Wimmer |
| 6,107,533 | A | * | 8/2000 | Vebeliunas et al. ........... 585/259 |
| 2002/0004622 | A1 | * | 1/2002 | Dai et al. ..................... 585/260 |
| 2003/0171629 | A1 | | 9/2003 | Ryu et al. |
| 2004/0019245 | A1 | * | 1/2004 | Gartside et al. ............. 585/259 |

FOREIGN PATENT DOCUMENTS

| EP | 0 825 245 A2 | 2/1998 |
| GB | 846679 | 8/1960 |
| GB | 1133253 | 11/1968 |
| JP | XP002096743 | 8/1987 |
| WO | WO 99/15485 | 4/1999 |

* cited by examiner

*Primary Examiner*—Walter D Griffin
*Assistant Examiner*—Lessanework Seifu
(74) *Attorney, Agent, or Firm*—Brooks Kushman P.C.

(57) ABSTRACT

The present invention provides a method and apparatus for removing acetylene from a gasoeus mixture comprising hydrogen, methane, ethane, ethylene, acetylene, propane, propylene, butane, butenes, butadiene, and other C4 or higher hydrocarbons. The method of the invention utilizes a front-end acetylene removal unit ("ARU") located after a charge gas compressor in which acetylene is selectively reduced. The method of the invention achieves selective reduction of acetylene by using a proprietary Chevron Phillips E series palladium based catalyst. The method of the invention also utilizes a novel startup procedure, a novel emergency shutdown procedure, a novel maximum cool down procedure, and a novel carbon monoxide monitoring procedure.

19 Claims, 1 Drawing Sheet

ACETYLENE REMOVAL METHODS AND APPARATUS

CROSS-REFERENCE TO RELATED APPLICATIONS

This application claims the benefit of U.S. Provisional Application Ser. No. 60/558,027 filed Mar. 31, 2004. This application is hereby incorporated by reference.

BACKGROUND OF THE INVENTION

1. Field of the Invention

The present invention relates to an apparatus and methods for removing acetylene from a cracked gas mixture; and in particular, to an apparatus and methods for removal of acetylene from a cracked gas mixture using a palladium containing catalyst.

2. Background Art

Cracking is a chemical process in which high temperature is applied to break apart and convert heavier hydrocarbons in lighter hydrocarbons. Various hydrocarbons and hydrocarbon mixtures are cracked to prepare a number of lower alkenes which may be used in a multitude of chemical manufacturing processes. In particular, cracking processes are used in the production of ethylene, an important precursor to many types of plastics. After cracking, a mixture of hydrocarbon compounds that must be subsequently purified is the result. The removal of acetylene from ethylene producing processes is of particular concern because of the difficulty in removing this compound.

Currently, a number of processes exist for the removal of acetylene from ethylene producing processes. Such processes include, front-end de-propanizer acetylene removal units ("ARU"), front-end de-ethanizer ARU, and tail-end ARU. Front-end de-propanizer ARU typically employ a Pd catalyst acetylene hydrogenation system located on the front-end (of distillation train) de-propanizer overhead stream. This ARU hydrogenates all of the acetylene and most of the methyl acetylene/propadiene ("MAPD") on a propane and lighter stream. In processes utilizing Front-End De-Ethanizer ARU, a Pd catalyst acetylene hydrogenation system located on the front-end (of distillation train) de-ethanizer overhead stream is typically used. This ARU hydrogenates all of the acetylene, but not MAPD on an ethane and lighter stream. If a plant of this type is maximizing propylene recovery, a separate MAPD hydrogenation reactor system and possibly a green oil removal system on the $C_3$ product stream may be required.

The tail-end acetylene removal system usually employs a Pd catalyst acetylene hydrogenation system located on the de-ethanizer overhead stream, where the de-ethanizer is located after the de-methanizer in the distillation train. This ARU hydrogenates all of the acetylene, but no MAPD, on a stream primarily composed of ethane and ethylene. Moreover, tail-end ARU systems normally require a green oil removal system on the $C_2$ product stream. Furthermore, if a plant of this type is maximizing propylene recovery, a separate MAPD hydrogenation reactor system and possibly a green oil removal system on the $C_3$ product stream may be required.

Each of the acetylene removal processes described above requires the utilization of expensive processing equipment. Moreover, each of the prior art acetylene removal processes utilize a catalyst for the selective reduction of acetylene. Experience has taught that such catalysts are prone to runaway reactions that may potentially cause a dangerous temperature rise or excursion. Start up of the acetylene removal units, especially with fresh catalyst is the time when these reactors are most susceptible to runaway reactions.

Accordingly, there exists a need in the prior art for an improved methods and apparatus of removing acetylene from a cracked gas mixture with reduced capital equipment costs. Specifically, there is a need for an improved method and apparatus for starting up such acetylene removal units and in the case of a thermal runaway for shutting down acetylene removal units.

SUMMARY OF THE INVENTION

The present invention overcomes one or more problems of the prior art by providing in at least one embodiment of the present invention, a method and apparatus for removing acetylene from a gaseous mixture comprising hydrogen, methane, ethane, ethylene, acetylene, propane, propylene, butane, butenes, butadiene, and other $C_4$ or higher hydrocarbons. The method of the invention utilizes a front-end acetylene removal unit ("ARU") located after a charge gas compressor in which acetylene is selectively reduced. The method of the invention achieves selective reduction of acetylene by using a proprietary Chevron Phillips E series palladium-based catalyst.

The method of the invention comprises cracking a hydrocarbon feedstock in one or more cracking furnaces to form a raw cracked gas mixture comprising hydrogen, methane, ethane, ethylene, acetylene, propane, propylene, butane, one or more butenes, and butadiene. The raw cracked gas mixture is then compressed with a multi-stage compressor unit (i.e., the charge gas compressor) which is then contacted with a palladium-containing catalyst at a sufficient temperature and pressure such that a portion (i.e., preferably essentially all) of the acetylene in the raw cracked gas mixture is converted to ethylene. The palladium-containing catalyst is contained in one or more acetylene removal units. Finally, the acetylene removal units are provided with a fresh or regenerated catalyst at a time interval equal to or greater than one year from the time at which the palladium containing catalyst is first contacted with the raw cracked gas mixture. The method of the invention also utilizes a novel startup procedure, a novel emergency shutdown procedure, a novel maximum cool down procedure, and a novel carbon monoxide monitoring procedure.

DETAILED DESCRIPTION OF THE PREFERRED EMBODIMENT(S)

Figure 1:
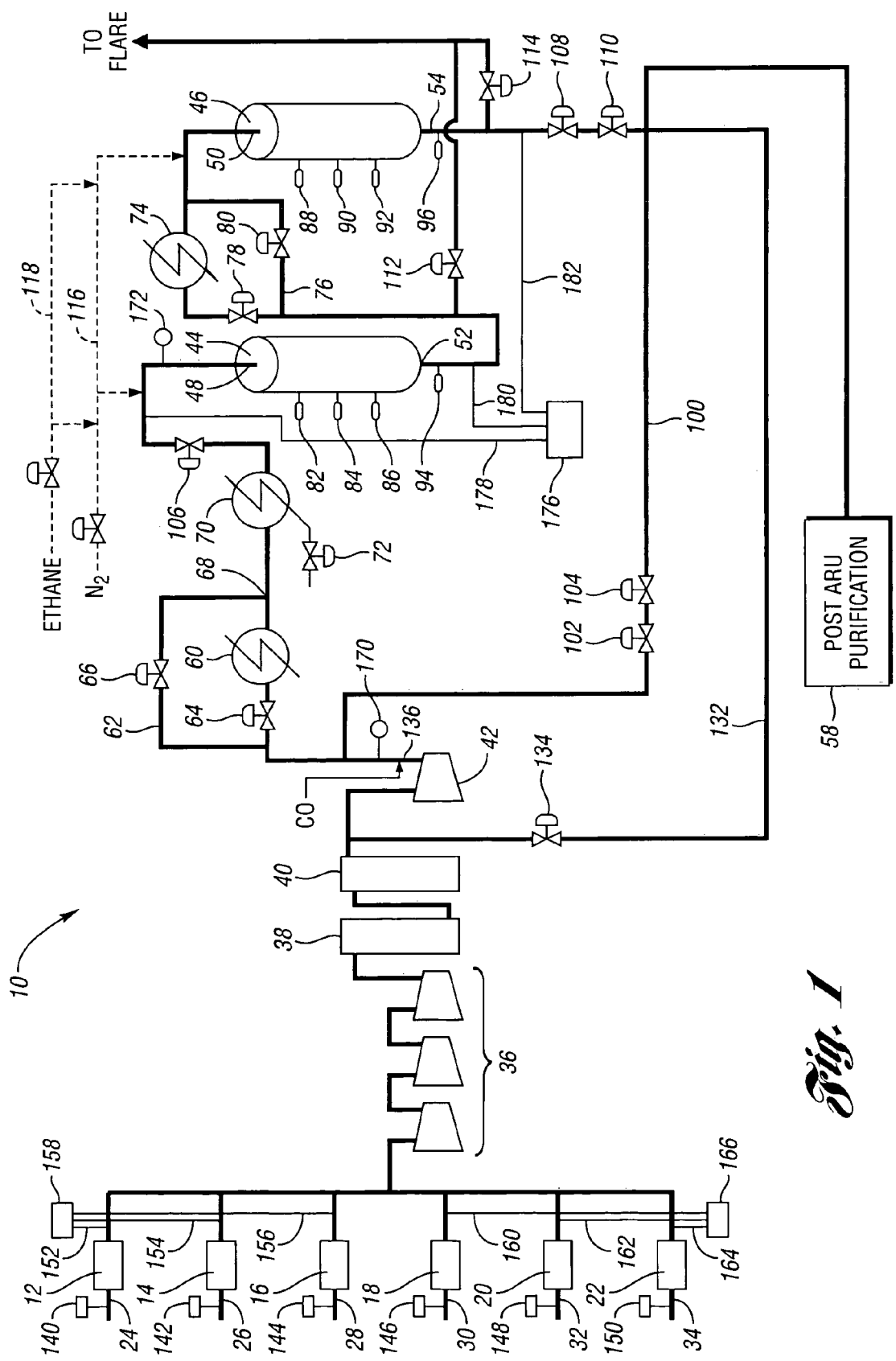
FIG. 1 is a schematic of the cracked gas purification apparatus that executes the method of the present invention.

Reference will now be made in detail to presently preferred compositions or embodiments and methods of the invention, which constitute the best modes of practicing the invention presently known to the inventors.

In an embodiment of the present invention, an apparatus and related method for removing acetylene from a raw cracked gas mixture is provided. The apparatus and method of the invention is most advantageously used when the cracked gas mixture comprising hydrogen, methane, ethane, ethylene, acetylene, propane, propylene, butane, butenes, and butadiene. Moreover, the cracked gas mixture may also contain $C_4$ and higher hydrocarbons. The method of the invention utilizes a front-end acetylene removal unit ("ARU") containing a proprietary Chevron Phillips E series palladium based catalyst located after a multistage charge gas compressor in which acetylene is selectively reduced.

With reference to FIG. 1, cracked gas purification apparatus 10 includes cracking furnaces 12, 14, 16, 18, 20, 22. A hydrocarbon feedstock is introduced into cracking furnaces 12-22 at inlet ports 24, 26, 28, 30, 32, 34 and cracked in the cracking furnaces to form a cracked gas mixture which comprises hydrogen, methane, ethane, ethylene, acetylene, propane, propylene, butane, one or more butenes, and butadiene. Cracking is achieved by heating the hydrocarbon feedstock at a sufficient high temperature to crack the feedstock into the lower molecular weight compounds that comprise the raw cracked gas mixture. The cracked gas mixture is compressed with one or more compression stages 36 of a multi-stage compressor unit. Next, the cracked gas mixture is scrubbed with caustic scrubber 38 and then preferably dried with drier 40 and then further compressed with additional compression stage 42 of the multi-stage compression unit. The raw cracked gas is then contacted with a palladium-containing catalyst contained in acetylene removal units 44, 46 at a sufficient temperature and pressure such that a portion (i.e., preferably essentially all) of the acetylene in the cracked gas mixture is converted to ethylene. Acetylene removal units 44, 46 include inlet ports 48, 50 and outlet ports 52, 54. After flowing through acetylene removal units 44, 46 the cracked gas mixture (which has now had acetylene removed) is contacted by a series of post-acetylene reduction purifiers that remove and purify the constituent hydrocarbon compounds in the cracked gas mixture as indicated by block 58. It will be appreciated that one acetylene removal unit may also be used as well as more than two acetylene removal units may be used in practicing the present invention. A particular advantage of the present invention is that the one or more acetylene removal units are capable of running for a time interval equal to or greater than about one year before regenerating the catalyst (or replacing the catalyst with fresh catalyst.) This time interval is measured from the date at which the catalyst is first contacted with the cracked gas until the time at which regenerating of the one or more acetylene removal units is performed. More preferably, the one or more acetylene removal units are not regenerated (or replacing the catalyst with fresh catalyst) for a time interval equal to or greater than eighteen months from the time at which the palladium containing-catalyst was first contacted with cracked gas mixture; and most preferably, the one or more acetylene removal units are not regenerated (or replacing the catalyst with fresh catalyst) for a time interval equal to or greater than two years from the time at which the palladium containing-catalyst was first contacted with cracked gas mixture. Although virtually any hydrocarbon feedstock that cracks into a distribution of hydrocarbons may be used in the practice of the invention, preferred hydrocarbon feedstocks include, for example, ethane, propane, butane, hydrocarbon liquids, and mixtures thereof may be used as the feedstock.

Still referring to FIG. 1, a portion of the compressed raw gas mixture is preferably passed through cooler 60 after emerging from compression stage 42. During normal operation, a second portion of the compressed cracked raw gas mixture is also allowed to flow through bypass 62. The flow of the cracked gas through cooler 60 and bypass 62 is controlled by valves 64, 66 which are under computer control. The two cracked gas mixtures are recombined before entering heater 70 at position 68. Heater 70 allows for reheating of the cracked gas mixture. A useful heater for this purpose uses steam as the heat source. Valve 72 controls the flow of steam to heater 70. The combination of first cooling the cracked gas mixture and then reheating the gas allows for the temperature to be more accurately controlled before the cracked gas mixture is flowed into acetylene removal units 44, 46. Similarly, after emerging from acetylene removal unit 44, a portion of the cracked gas mixture (which now has had some of the acetylene converted to ethylene) is preferably cooled by flowing through cooler 74 during normal operation. A second portion of the cracked gas mixture also flows through bypass 76. The flow of the cracked gas mixture through cooler 74 and bypass 76 is controlled by valves 78, 80 which are also under computer control.

In a variation of the present invention, a method and apparatus for cooling the cracked gas mixture is provided. With reference to FIG. 1, a portion of the compressed raw gas mixture is preferably passed through cooler 60 after emerging from compression stage 42 and a second portion flowed through bypass 62. Similarly, after emerging from acetylene removal unit 44, the cracked gas mixture is divided again wherein a portion flows through cooler 74 and a second portion through bypass 76. The temperatures within acetylene removal units 44, 46 are carefully monitored by temperature measuring devices 82, 84, 86, 88, 90, 92 positioned at various levels in the catalyst. Moreover, the temperature of the cracked gas emerging from acetylene removal units 44, 46 is measured by temperature measuring devices 94, 96 positioned at outlet ports 52, 54. These temperature measurements allow the cracked gas purification apparatus to detect the occurrence of a temperature excursion (i.e., the temperature rises above a predetermined value.) Temperature measuring devices 82-96 may be any type of temperature measuring device such as thermocouples and RTDs. These temperature measuring devices are advantageously multiplex measuring devices (duplex, triplex, etc.) A high temperature set-point for which a shutdown is initiated is programmed in a control device such as a PLC. Improved accuracy of the temperature measurement is achieved through a voting strategy. For example, when a duplex thermocouple is used, each of the two temperature measurements from such a device must agree that a high temperature rise has occurred. Similarly, when a triplex thermocouple (or RTD) is used two out of the three temperature measurements from such a device must agree that a temperature rise above the set-point has occurred. Such a voting strategy ensures that a spurious high temperature reading does not initiate a shutdown. Such spurious readings can result from "burn out" in which an artificially high temperature is read from the temperature measuring device.

For the E-Series Pd catalysts used in the present invention, the greatest risk of a temperature excursion is during startup and initial pressurization of the acetylene removal units. Stagnation and hot spots that lead to a runaway condition may occur with these catalysts. Two distinct startup scenarios exist:

1. startup with a fresh (new) catalyst and
2. startup from an emergency trip (i.e, the system has shut down because of the occurrence of an emergency condition).

When acetylene removal units 44, 46 are started with new, fresh catalyst accurate temperature control is paramount for preventing a runaway reaction. With such catalysts, as unsaturated hydrocarbon molecules pass through the catalyst (which is not passivated), the catalyst is very active and more likely to initiate a runaway reaction. In either scenario, when a temperature rise above a first predetermined value occurs, a cracked gas cooling procedure is initiated. This cracked gas cooling procedure is referred to as maximum cooling. During a temperature excursion, valves 64, 66 are adjusted such that all of the cracked gas is flowed through cooler 60. Heating provided by heater 70 is stopped. Again, during a temperature overrun, in acetylene removal units 44, 46, valves 78, 80 are adjusted such that all of the cracked gas is flowed through cooler 74. For the E-Series palladium catalysts used in the present invention, the first predetermined temperature is about 220° F. to about 250° F.

Although, the cooling method described above is sufficient for bringing most temperature excursions under control, there are potentially circumstances when this cooling is ineffective in bringing a runaway reaction under control. In such circumstances, an emergency shutdown procedure is initiated when the temperature rises above a second predetermined temperature that is typically higher than the second predetermined temperature. For the E-series palladium catalysts used in the present invention, this temperature is typically from about 300° F. to about 330° F. Such an emergency shutdown procedure comprises diverting the cracked gas mixture through the bypass conduit 100 by opening valves 102, 104, isolating the one or more acetylene removal units by closing valves 106, 108, 110, and then removing at least a portion of the cracked gas contained in the one or more acetylene removal units. Preferably, most of the cracked gas mixture is removed from the acetylene removal units by opening valves 112, 114 and then pass through a flare in which it is burned before release into the environment. The acetylene removal units may then be further cooled and purged by flowing an inert gas such as nitrogen from purge supply line 116 through acetylene removal units 44, 46. Additional cooling and purging of acetylene removal units may also be provided by subsequently flowing an inert gas with a high heat capacity such as ethane from purge supply line 118 through acetylene removal units 44, 46. In this context, an inert gas is a gas that does not react with the Pd-base catalysts in the acetylene removal units.

For both the cracked gas cooling procedure and the emergency shutdown procedure, a PLC continuously monitors the reactor bed temperatures and the temperature near the exit of each reactor, the inlet flow to the reactors (if the inlet drops below a predetermined value a trip condition is initiated), the status indicator on the charge gas compressor, the DCS status, and the signal from the DCS and panel-board mounted hand-switches during plant operations. If any of these components registers an initiation to trip acetylene removal units 44, 46, the PLC activates the emergency shutdown system. With each initiator, there are specific criteria that must be met in order for the PLC to initiate the trip program. The shutdown system of the present invention also monitors the performance of other systems in the cracking plant. These other systems include the inlet flows to acetylene removal units 44, 46 the status of the charge gas compressor, which comprises compression stages 36, 42, the DCS status, and status of a hand-switch status that can trip acetylene removal units 44, 46. When a shutdown is initiated, multiple events occur to protect not only acetylene removal units 44, 46, but also the compressor. When the emergency shutdown program is initiated, acetylene removal units 44, 46 are bypassed, isolated, and depressurized. First, ARU bypass valves 102, 104 are opened to prevent deadheading the compressor. At a predetermined time (about 3 to 5 seconds) after the bypass valves are opened, acetylene removal units 44, 46 are isolated by closing the ARU inlet valve 106 and outlet isolation valves 108, 110. After a second pre-determined time (about 10 to 15 seconds) acetylene removal units 44, 46 are depressurized. Acetylene removal units 44, 46 are equipped with flare valves 112, 114. Valves 112, 114 open simultaneously and depressurize both reactors to a flare. Finally, solenoid valves on the control valves are de-energized to allow them to fail in the proper position.

During the emergency shutdown sequence, a unique, valve-tracking program is also initiated to prepare the system for safe isolation and re-start. While the PLC is initiating each step of the shutdown process, it simultaneously sends a discrete output to the DCS indicating which step has been completed. This allows the DCS to put the valves in the correct position for resetting the PLC after the shutdown program has been completed. For example, when the PLC opens bypass valves 102, 104 using a solenoid, the DCS will set the analog signal to the bypass valves at 100% open. This places the valves in the correct fail-safe position for resetting the PLC for startup. Otherwise, the bypass valves would close as soon as the solenoid valve on the air supply to the control valve was re-energized during the reset. Each of the emergency shutdown programs are initiated and completed within approximately 15 seconds and are designed to stop the runaway reaction by removing the reactants and the heat from the reactor system. Facilities and procedures were also added to manually purge the reactors with nitrogen, and an olefin-free hydrocarbon stream to further cool the reactors following a runaway trip. The emergency shutdown system and ARU controls cannot be reset until all trip conditions have cleared, and the operator manually resets the PLC emergency shutdown program on the DCS.

Accurate temperature measurement is of paramount importance in detecting a temperature excursion before either the maximum cooling or emergency shutdown procedure is implemented. The expense of a spurious determination of a temperature overrun should be avoided. During normal operation, a distributed control system ("DCS") is the primary controller for the maximum cooling system. (Alternatively, the PLC may also be used as the primary controller.) Temperature readings from each ARU reactor and from a position near the exit of each ARU reactor are sent from a PLC to the DCS. The DCS compares the maximum temperature measured from the locations to a maximum cooling temperature set-point used to initiate this mode of operation. If a temperature indicator exceeds this set point, the DCS immediately initiates maximum cooling. The present invention also provides a control strategy in which the accuracy of a temperature reading is improved by redundant measurement of the temperatures by two or more temperature measuring devices. Specifically, duplex or triplex temperature measuring devices (e.g. thermocouples, RTDs) are used to measure the temperature. When a duplex measuring device is used, the two temperature measurements from such a device must agree that a temperature rise above the set-point has occurred. When a triplex temperature-measuring device is used, two out of the three temperature measurements from such a device must agree that a temperature rise above the set-point has occurred. Optionally, improved temperature monitoring is achieved by further requiring that the temperature measurements from the duplex or triplex devices be within a predetermined interval as compared to each temperature measurement before the measurements are accepted as accurate (typically, about 30° F.) This latter requirement safeguards against a spurious high reading being the result of a broken thermocouple or RTD.

During the maximum cooling mode of operation, the DCS automatically routes all of the cracked gas through the feed pre-cooler and through the mid-bed cooler(s) to chill the gas to both reactors as much as possible. The DCS also closes the valve on the steam to the reactor pre-heater (if present) to prevent heating the gas after it has been cooled. Maximum cooling mode offers a first-line protection against a runaway reaction. It is designed to slow down or stop the hydrogenation reaction and subsequent temperature increases associated with a runaway reaction. The maximum cooling mode of operation stays under DCS control until the operator resets the DCS maximum cooling program. This program only resets if all of the initiators have cleared (all temperatures are below the maximum cooling set-point). If maximum cooling does not stop the reaction/temperature excursion, the emergency shutdown system controlled by the PLC will take over.

In another embodiment of the present invention, an improved procedure for starting the acetylene removal method set forth above is provided. The startup system deploys a method of starting the ARU with improved safety features to avoid thermal runaway. With reference to FIG. 1, an inert gas is flowed through cracked gas purification apparatus 10 in a recycling configuration. The inert gas flows through compressor stages 36 and 42 of the charge gas compressor and bypass conduit 100 and recycling conduit 132. The gas recycles through recycling conduit 132. The inert gas is flowed until compressor stage 42, bypass conduit 100, and recycling conduit 132 are up to operating pressure. Typically, this is approximately the pressure at which cracked gas purification apparatus 10 normally operates which is greater than about 400 psig. (preferably about 400-600 psig.) Valves 64, 66, 102, 104, 134 control the flow through bypass 100 and recycling conduit 132. Inert gas in this context means a gas that does not react with the catalyst contained in acetylene removal units 44, 46. After the recycling portion is up to pressure, the inert gas is allowed to flow into acetylene removal units 44, 46. The acetylene removal units are allowed to come up to operating pressure (same as above). After coming up to pressure, cracked gas is formed in the cracking furnaces 12-22 and allowed to flow into acetylene removal units 44, 46. Finally, acetylene removal units are allowed to heat up so that reduction of acetylene is allowed to occur. Typically, this temperature is from about 120° F. to about 220° F. In other variations, this temperature is from about 120° F. to about 150° F.

Suitable inert gases include gaseous low sulfur alkanes and nitrogen gas. Low sulfur (ppb level) natural gas is particularly useful because of its low price and ready availability. The inert gas is preferably passed through the charge gas compressor. If a fresh catalyst is present in acetylene removal units 44, 46, supplemental carbon monoxide sources are added to the cracked gas mixture at position 136 just upstream of bypass conduit 100 to ensure that the carbon monoxide concentration is sufficient to prevent a runaway reaction. The inert gas is allowed to pressure up and flow through the recycle loop for several hours. Next, the inert gas with high carbon monoxide levels is allowed to flow through acetylene removal units 44, 46. The high level of carbon monoxide acts to passivate the fresh catalyst before the introduction of cracked gas. After the carbon monoxide concentration is established (i.e., above about 1000-2000 ppm) and the pressure is sufficient for operation (i.e., 500-600 psi), the cracking furnaces are brought on-line with minimal sulfur injection to keep carbon monoxide levels high so that the supplemental carbon monoxide source can quickly be eliminated. When cracked gas is first introduced, cracked gas purification apparatus 10 is left in the maximum cooling mode set forth above to minimize hydrogenation reactions. However, the minimum temperature is limited by condensation of the feed components, requiring the operator to reset maximum cooling and begin increasing the reactor feed temperatures. With sufficient carbon monoxide in the feed, increasing the temperature to stay above the condensation limits causes no increased safety concerns. As the feed rates to acetylene removal units 44, 46 stabilize above a low flow set-point, the carbon monoxide level is reduced by eliminating the supplemental source and injecting sulfur to the furnaces. When necessary (usually about two hours after the cracked gas is first introduced into acetylene removal units 44, 46), sulfur injection is provided to the hydrocarbon feed stock with sulfur injectors 140, 142, 144, 146, 148, 150 to provide additional control of the carbon monoxide concentration. At this point, the inlet gas temperatures are slowly increased to initiate acetylene hydrogenation. Preferably, normal operation of cracked gas purification apparatus 10 is achieved within four hours of cracked gas addition to acetylene removal units 44, 46.

In another embodiment of the present invention, a carbon monoxide monitoring method and apparatus to be utilized with cracked gas purification apparatus 10 is provided. The carbon monoxide monitoring system provides a method of monitoring carbon monoxide levels in the cracked raw gas provided to the acetylene removal units. Sample tubes 152, 154, 156 of carbon monoxide detector 158 and sample tubes 160, 162, 164 of carbon monoxide detector 166 are strategically placed at each exit of cracking furnaces 12-22. Carbon monoxide detectors 158, 166 are each multi-stream GC analyzers which are also capable of measuring other chemical species in addition to carbon monoxide. These analyzers measure ppm-level carbon monoxide from each furnace. The analyzers were designed for a minimum cycle time so that operators can adjust the furnace operations, receive timely feedback and make the necessary downstream changes on the acetylene reactors and/or other equipment to keep plant operation stable. Furthermore, additional analyzers were also installed about acetylene removal units 44, 46. Infrared carbon monoxide analyzer 170 is installed near the entrance to bypass conduit 100, upstream of acetylene removal units 44, 46. Carbon monoxide analyzer 170 allows the operator to have an "instantaneous" measurement of the carbon monoxide concentration in the cracked gas fed to acetylene removal units 44, 46, even when the reactors are bypassed during startup or during an unplanned trip. This analysis is critical since it allows the operator to anticipate the activity level of the palladium-based catalyst when cracked gas is introduced to the reactors. A second infrared carbon monoxide analyzer 172 is installed downstream of reactor feed control valve 106, just upstream of acetylene removal units 44, 46. A multi-stream GC analyzer 176 is added to the ARU system to measure the ppm-level acetylene in the feed at the inlet to acetylene removal unit 44 via sample tube 178, at the outlet acetylene removal unit 44 via sample tube 180, and at the outlet of acetylene removal unit 46 via sample tube 182. Each of these analyzers are critical to safe operation, product quality, operational stability and optimum selectivity of the acetylene removal apparatus. As carbon monoxide is a temporary poison to the palladium-based catalyst, it was imperative that control of the carbon monoxide produced in the furnaces was optimized. When the carbon monoxide is observed to rise, a sulfur-containing compound is selectively injected into the cracking furnaces into which a carbon monoxide excursion has occurred. Suitable sulfur-containing compounds include, for example, ditertiary-butyl polysulfide ("TBPS"), di-t-nonylpolysulfide, hydrogen sulfide, dimethyl sulfide, dimethyldisulfide, diethylsulfide, and combinations thereof. This selective injection of the sulfur-containing compound provides a more robust and efficient process control.

One important aspect of the E-Series catalyst system used in the present invention is the catalyst's ability to withstand sudden drops in the carbon monoxide level in the reactor without causing runaway reaction in front-end reactors. It is believed that the catalyst's proprietary promoter(s) minimize the impact of fluctuations in the carbon monoxide concentration on the catalyst surface by maintaining the carbon monoxide level at a minimum level near the reaction sites. This minimum carbon monoxide concentration prevents the access of the ethylene to the reaction sites, even when the acetylene level is low. Although the E-series catalysts offer robustness with respect to sudden drops of carbon monoxide, carbon monoxide control is still paramount to running a high efficiency cracking plant. In the present invention, several carbon monoxide monitors are placed at key positions in the cracking plant.

In practicing the present invention, high levels of carbon monoxide which would inhibit catalyst activity are reduced by the injection of a sulfur containing compound to one or more of the cracking furnaces. TBPS proved to be the most convenient and safe form of sulfur addition for carbon monoxide control. Since each furnace is individually equipped with a TBPS pump, TBPS injection may be targeted to just the furnaces in which the carbon monoxide levels are too high. This selectively targeting of the cracking furnaces enables better control of the carbon monoxide level at the ARU resulting in better control of the activity and selectivity of the catalyst. TBPS addition to the furnaces has proven to be one of the most effective forms of reactor control when furnace swaps are made or other carbon monoxide excursions occur.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method of selectively removing acetylene from a raw cracked gas mixture, the method comprising:
    cracking a hydrocarbon feedstock in one or more cracking furnaces to form the raw cracked gas mixture comprising hydrogen, methane, ethane, ethylene, acetylene, propane, propylene, butane, one or more butenes, carbon monoxide, and butadiene;
    separately monitoring the amount of carbon monoxide present in the raw cracked gas mixture emerging from each of the one or more cracking furnaces
    injecting a sulfur containing compound into the feed gas entering any of the one or more cracking furnaces from which the emerging raw cracked gas mixture is observed to have a carbon monoxide concentration greater than a predetermined value
    compressing the raw cracked gas mixture with a multistage compressor unit;
    contacting the raw cracked gas mixture with a palladium-containing catalyst at a sufficient temperature and pressure such that a portion of the acetylene in the raw cracked gas mixture is converted to ethylene, the palladium-containing catalyst being contained in one or more acetylene removal units; and
    regenerating the palladium-containing catalyst at a time interval equal to or greater than one year from the time at which the palladium containing catalyst is first contacted with raw cracked gas mixture.

2. The method of claim 1 wherein the one or more acetylene removal units are not regenerated for a time interval equal to or greater than eighteen months from the time at which the palladium containing-catalyst was first contacted with raw cracked gas mixture.

3. The method of claim 1 wherein the one or more acetylene removal units are not regenerated for a time interval equal to or greater than two years from the time at which the palladium containing-catalyst was first contacted with raw cracked gas mixture.

4. The method of claim 1 wherein the hydrocarbon feedstock is selected from the group consisting of ethane, propane, butane, hydrocarbon liquids, and mixtures thereof.

5. The method of claim 1 further comprising cooling at least a portion of the raw cracked gas mixture before the raw cracked gas mixture is contacted with the palladium-containing catalyst.

6. The method of claim 5 further comprising heating the raw cracked gas mixture after the raw cracked gas mixture is cooled and before the raw cracked gas mixture is contacted with the palladium-containing catalyst.

7. The method of claim 1 further comprising cooling at least a portion of the raw cracked gas mixture as the raw cracked gas mixture passes between each of the one or more acetylene removal units.

8. The method of claim 1 further comprising measuring the temperature at one or more locations in the one or more acetylene removal units and at the outlet ports of the one or more acetylene removal units.

9. The method of claim 8 further comprising initiating a raw cracked gas cooling procedure when a temperature measurement exceeds a first predetermined value, the cooling procedure including a step of flowing the raw cracked gas through a cooler.

10. The method of claim 9 wherein the temperature at the one or more locations is measured by two or more temperature measuring devices.

11. The method of claim 10 wherein the temperature measurement is determined to exceed a predetermined value if two or more individual temperature measurements agree that the predetermined value has been exceeded.

12. The method of claim 10 wherein the raw cracked gas cooling procedure comprises:
    routing all of the raw cracked gas through a cooler located upstream of the one or more acetylene removal units.

13. The method of claim 12 further comprising:
    routing all of the raw cracked gas mixture through one or more axillary coolers located between each of the acetylene removal units if there are two or more acetylene removal units; and
    ceasing heating of the raw cracked gas if such heating is being provided.

14. The method of claim 8 further comprising initiating a raw cracked gas cooling procedure when a temperature measurement exceeds a second predetermined value.

15. The method of claim 14 further comprising:
    diverting the raw cracked gas mixture through a bypass conduit;
    isolating the one or more acetylene removal units; and
    removing at least a portion of the raw cracked gas contained in the one or more acetylene removal units.

16. The method of claim 1 wherein the sulfur containing compound comprises a component selected from the group consisting of ditertiary-butyl polysulfide, di-t-nonylpolysulfide, hydrogen sulfide, dimethyl sulfide, dimethyldisulfide, diethylsulfide, and combinations thereof.

17. A method of selectively removing acetylene from a raw cracked gas mixture, the method comprising:
    cracking a hydrocarbon feedstock in one or more cracking furnaces to form the raw cracked gas mixture comprising hydrogen, methane, ethane, ethylene, acetylene, propane, propylene, butane, one or more butenes, carbon monoxide, and butadiene;

compressing the raw cracked gas mixture with a multistage compressor unit;

contacting the raw cracked gas mixture with a palladium-containing catalyst at a sufficient temperature and pressure such that a portion of the acetylene in the raw cracked gas mixture is converted to ethylene, the palladium-containing catalyst being contained in one or more acetylene removal units;

regenerating the palladium-containing catalyst at a time interval equal to or greater than one year from the time at which the palladium containing catalyst is first contacted with raw cracked gas mixture;

measuring the temperature at one or more locations in the one or more acetylene removal units and at the outlet ports of the one or more acetylene removal units; and initiating a raw cracked gas cooling procedure when a temperature measurement exceeds a second predetermined value, the cooling procedure comprising:

diverting the raw cracked gas mixture through a bypass conduit;

isolating the one or more acetylene removal units; and removing at least a portion of the raw cracked gas contained in the one or more acetylene removal units.

18. The method of claim 17 further comprising injection of a sulfur containing compound into the feed gas entering any of the one or more cracking furnaces from which the emerging raw cracked gas mixture is observed to have a carbon monoxide concentration greater than a predetermined value.

19. The method of claim 18 wherein the sulfur containing compound comprises a component selected from the group consisting of ditertiary-butyl polysulfide, di-t-nonylpolysulfide, hydrogen sulfide, dimethyl sulfide, dimethyldisulfide, diethylsulfide, and combinations thereof.

* * * * *